United States Patent [19]

Vilard

[11] Patent Number: 5,040,065

[45] Date of Patent: Aug. 13, 1991

[54] VIDEO IMAGE REPRODUCING APPARATUS PROVIDED WITH A CONTRAST ADJUSTMENT DEVICE, AND METHOD OF ADJUSTING THE CONTRAST IN SUCH A REPRODUCING APPARATUS

[75] Inventor: Philippe Vilard, Rueil, France

[73] Assignee: U.S. Philips Corporation, New York, N.Y.

[21] Appl. No.: 452,981

[22] Filed: Dec. 19, 1989

[30] Foreign Application Priority Data

Dec. 20, 1988 [FR] France ................... 88 16838

[51] Int. Cl.⁵ .................. H04N 5/57; H04N 9/64
[52] U.S. Cl. ................................ 358/169; 358/27
[58] Field of Search ............ 358/169, 27, 160, 168, 358/172, 171

[56] References Cited

U.S. PATENT DOCUMENTS

| 4,204,229 | 5/1980 | Heuze | 358/169 |
| 4,642,690 | 2/1987 | Hinn | 358/171 |
| 4,717,953 | 1/1988 | Chang et al. | 358/39 |
| 4,730,210 | 3/1988 | Leshko | 358/172 |

Primary Examiner—Howard W. Britton
Assistant Examiner—Wendy R. Greening
Attorney, Agent, or Firm—Edward W. Goodman

[57] ABSTRACT

The readjustment of the image contrast is effected by a processing circuit (12) of the video signal, provided with a contrast control terminal (21). Among the devices which automatically act on the contrast, the device for comparing the peak values of the video signal to a reference threshold (Vref) is also used for manual adjustment. The gain of the amplification of the video signal in the processing circuit is increased such that, for the majority of images, the peak values of the video signal reach the reference threshold (Vref), while a user control varies this reference threshold to effect the manual adjusting.

7 Claims, 2 Drawing Sheets

VIDEO IMAGE REPRODUCING APPARATUS PROVIDED WITH A CONTRAST ADJUSTMENT DEVICE, AND METHOD OF ADJUSTING THE CONTRAST IN SUCH A REPRODUCING APPARATUS

BACKGROUND OF THE INVENTION

1. Field of the Invention

The present invention relates to an apparatus for reproducing an image on a cathode-ray tube, including a video signal processing circuit for providing inter alia a preamplification of the video signal either with a given maximum gain or a reduced gain with respect to the maximum gain to modify the image contrast, said processing circuit having a contrast control terminal for receiving a variable control voltage, the apparatus also including a contrast control circuit comprising:

- a device for comparing peak values of the video signal (of each video signal R (red), V (green) and B blue)), to a reference threshold, and having an output !or applying a signal which is supplied when this threshold is exceeded, after integration, to said contrast control terminal; and
- a manual contrast adjustment device for supplying a signal which is also applied to said contrast control terminal.

The contrast adjustment of a video image reproduced on a cathode-ray tube has for its object to satisfy several technical or esthetical requirements.

In the first place, it is current usage to limit the average value of the electron beam current of the tube, mainly to ensure an operating life of this tube in accordance with the life expectancies specified by its manufacturer (premature ageing effect of the cathodes when the mean beam current is too high), and also to ensure that the circuits which produce the very high voltage can correctly function with the utmost safety. For the case in which a very bright image must be reproduced, there is then every reason to reduce the amplification of the video signal while maintaining the black level, until a beam current is obtained which does not exceed the fixed limit. This actually means that an automatic reduction of the image contrast is produced, if this is necessary, so as not to exceed a given limit of the average beam current. These considerations also hold when a monochrome image reproduction or a color image reproduction is involved, in which case the notion average beam current must be understood to mean in actual practice the sum of the currents of the three electronic beams corresponding to the three guns of the color picture tube.

In the second place, and in accordance with more recent practice, also an additional automatic contrast reducing device is used which becomes operative when in certain images there are portions which are too bright for a correct reproduction, even if the ratio between the surface area of these portions is small compared with the overall surface of the image (and consequently do not in any significant manner influence the average beam current).

The cause of said error in the image reproduction mainly resides in the fact that during the reception of an excessively bright image portion, the corresponding signal causes a saturation of the video amplifier, which saturation, followed by a non-disregardable desaturation delay, produces an unacceptable halo in the image at the edges of the image portions. A further error associated with overbright image portions consist in a geometrical deformation of the remaining part of the image, which error is caused by the instantaneous overloading of the line scanning device. Thoughts might go towards effecting a clipping of the video signal peaks to limit the brightness of these exceptional image portions, but this would result in an unacceptable color of these image portions since this clipping would modify the respective portions of the signals R, G and B relative to the original proportions. In practice, one is compelled to act again on the contrast to bring the video signal level of the brightest portions of the image to a predetermined limit. Such an automatic gain reduction device is utilized for the case of monochrome or color reproduction.

In addition, measures are generally taken to provide the user with a manual contrast control so as to render it possible for him, for the same reason as for the brightness color adjustments, to adapt the reproduction to the exterior conditions (ambient brightness) and also to suit it to his personal taste.

2. Description of the Related Art

An example of automatic contrast control as a function of the ambient brightness, for a television set, is disclosed in the document U.S. Pat. No. 3,147,341 which, or that purpose, proposes to act on the automatic gain control circuit of the radio frequency and intermediate frequency (IF) stages. Actually, preference is however given to operate at a constant signal level at the output of the IF stage so as to ensure that the subsequent stages function in the optimum conditions for which these stages have been designed.

There appears to be one difficulty as regards the brightness adjustment arising from the fact that the multiple actions, automatic and manual, all end in a modification of the voltage of one single contrast control terminal of the video signal processing circuit. To the extent to which one wants to increase the efficiency of the automatic corrections, a reduction of the manual control effect is ultimately effected to the extent that in the majority of cases, there is a manual control range in which no visible effect is obtained, since the action on this control is compensated by the automatic limiter devices. To that effect, the brightness control button is even no longer included in the remote control housing, but is only placed on the television set itself.

SUMMARY OF THE INVENTION

The present invention has inter alia for its object to provide a solution for this difficulty, which solution can easily be put into effect in a remote controlled apparatus and consequently in the form of an adjustment by means of a circuit of the electronic potentiometer type.

To this effect, according to the invention, a video image reproducing apparatus is characterized in that the nominal gain of the amplification of the video signal is adequately high to provide that, for the majority of the received images, the peak values of the video signal (of each video signal R, G, B) reach said reference threshold, and in that, said reference threshold being adjustable, variation control means of the threshold constitute the manual contrast adjustment device.

The invention is based on the idea to utilize the automatic contrast correction, based on the detection of the brightest image portions, no longer as an exceptional correction for a minority of the received images, but rather as a means of permanent adjustment !or the majority of the images, which is obtained by increasing the gain of the video amplifier (and optionally of the preamplifier).

In these conditions, a manual contrast adjustment device which, in accordance with the invention, acts on the reference threshold, is more effective than the known adjustment devices as it results in an effect which is immediately perceptible to the user. In addition, the invention is particularly easy to put into effect in a color picture receiving apparatus because of the fact that the adjustment is obtained by the action of a single voltage variation and not by a variation of three voltages (one for each of the signals R, G, B).

Thus, an advantageous embodiment of the invention is characterized in that the manual contrast adjusting device includes a microprocessor for supplying square-wave pulse trains, these square-wave pulses constituting the reference threshold after filtering and amplification.

For an apparatus provided with a remote control, it is advantageously provided that this remote control includes at least one contrast variation control button, and that the square-wave pulse trains supplied by the microprocessor are modified in response to the action of said control button, by means of the signal transmitted by the remote control.

The use of a video signal processing circuit in the form of an integrated circuit is, in practice, of general usage in contemporary television sets because of its numerous advantages such as: saving in place, increased performances, simplification of the construction, which result in a lower price of the apparatus. In the case in which the integrated video circuit is provided with an integrated white limiter whose white limiting threshold value may be defined from the exterior, is advantageously provided with means for having said threshold value vary in relation with the operation of the contrast control by the user.

It is also interesting to utilize a data bus within the apparatus, for example a bus known as "bus I2-C", which is more specifically provided for a control of the value of the contrast.

If the integrated circuit is provided to ensure that the value of the white limit threshold is entered via the bus, the microprocessor which drives the apparatus is advantageously programmed in such a manner that when the user wants to adjust the contrast, his command acts in modifying the value of the white limit threshold indicated by the bus.

If the integrated circuit is provided to ensure that the white limit threshold is entered by applying an analog voltage to a plug, then a circuit is provided for decoding the command carried by the bus and to apply it to said plug.

The invention also relates to a method of adjusting the contrast in an image reproducing apparatus on a cathode-ray tube, in which a video signal is processed, and peak values of the video signal are compared with a reference threshold, in such a manner as to reduce automatically the contrast for the case in which the video signal (at least one of the video signals R, V, B) reaches said reference voltage, characterized in that a rather high nominal gain is used to amplify the video signal such that for the majority of the received images, said reference threshold is reached, and in that the reference threshold being variable, this threshold variation is used as a manual control of the contrast, which the user has at its disposal.

BRIEF DESCRIPTION OF THE DRAWINGS

Further particulars, details and advantages of the invention will now be more apparent from the following description which is given by way of non-limitative example with reference to the accompanying drawings, in which.

DESCRIPTION OF THE PREFERRED EMBODIMENT

Figure 1:
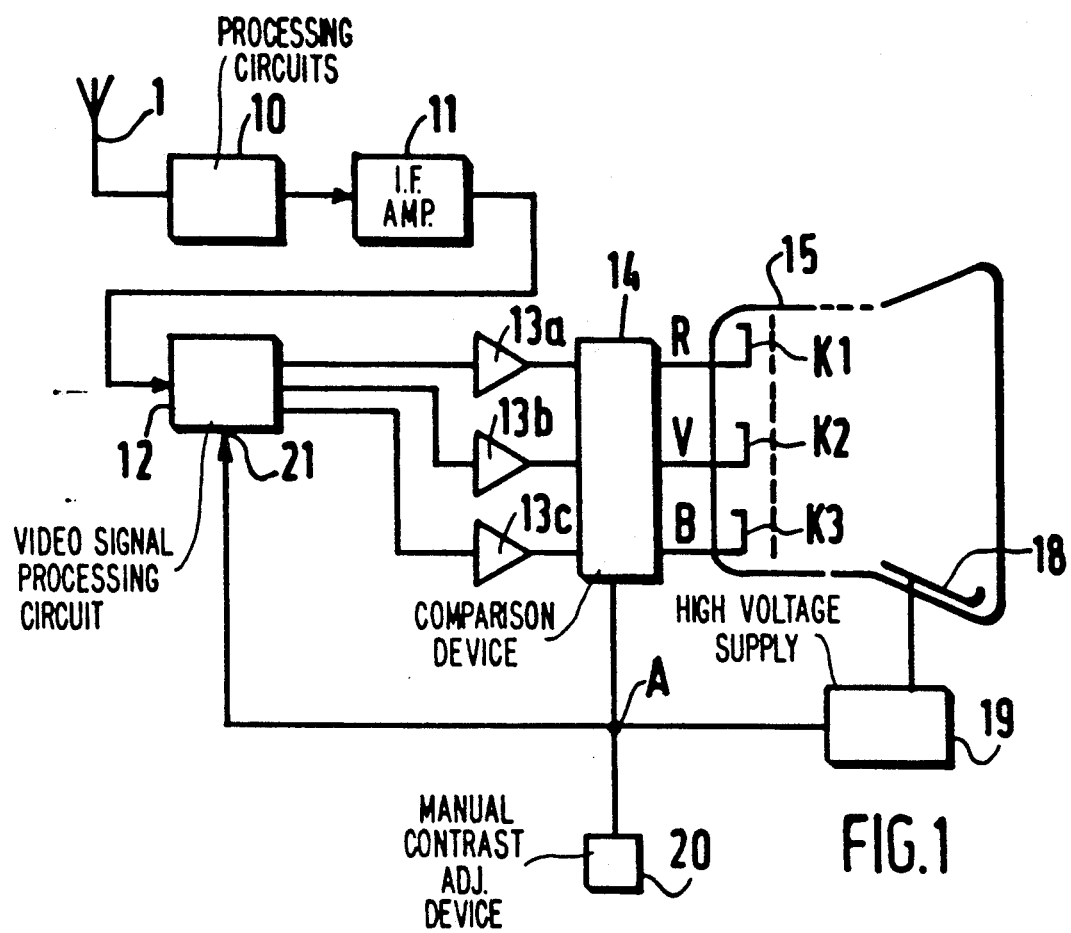
FIG. 1 is a block circuit diagram showing in a general manner the principal features of the functions of a color television set, as regards the processing of the video signal and the contrast adjustment.

As an example of a video image reproducing apparatus, FIG. 1 describes in a very Schematic manner the functions of the video signal processing operation of a color television set, and more specifically, the functions which relate to the adjustment of the image contrast. The receiving aerial 1 is connected to a block of processing circuits for the radio-frequency signal 10, from whose output the signals are transferred to a selective intermediate-frequency amplifier stage 11 which is followed by an integrated video signal processing circuit 12. The three color signals R (red), V (green) and B (blue) supplied by the processing circuit 12 are applied to three video amplifiers 13a, 13b, 13c, respectively, at the output of which each color signal is applied to each one of the three cathodes K1, K2, K3 of a cathode-ray tube 15 via a device 14 which effects the comparison of the peak values of each of these video signals R, V and B with a given reference threshold so as to reduce the contrast in the image and consequently the amplitude of the video signals when said reference threshold is reached.

The anode 18 of the tube 15 is supplied with a very high voltage by a device 19 which comprises means for measuring the average beam current of the tube 15 during operation, and compares the value of this average current to a further reference threshold in such a manner that the contrast in the image is also reduced when this further reference threshold is reached.

The contrast control signals produced by the devices 14 and 19 are combined in a junction point A, which is connected to the contrast control terminal 21 of the processing circuit 12.

The apparatus which is shown schematically in FIG. 1 also includes a manual contrast adjusting device 20 whose contrast control signal is also applied to the junction point A in response to an action at the same contrast control terminal 21 of the processing circuit 12.

It is not difficult to imagine that the convergence in a single point—the junction point A—, of signals originating from three specialized devices which function in different circumstances, in response to an action on a single control terminal 21 for the image contrast, poses serious problems. The invention proposes a solution to obviate these problems.

Figure 2:
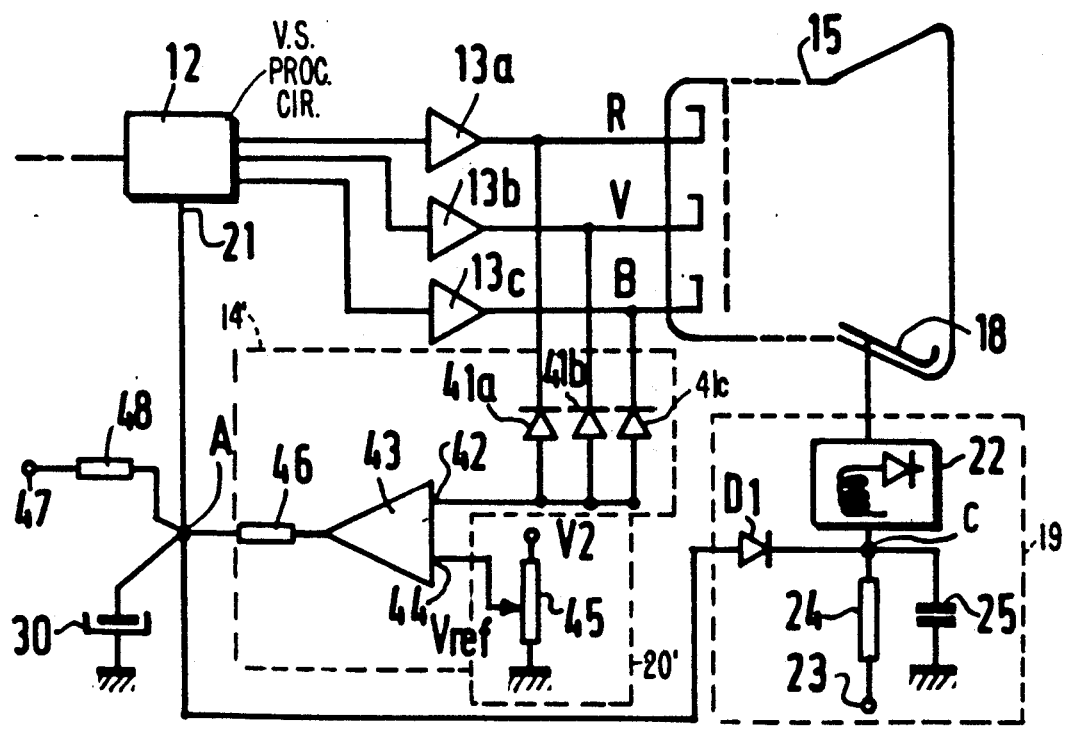
FIG. 2 is a somewhat more detailed circuit diagram of the apparatus of FIG. 1, in which the invention is put into effect.

The circuit diagram of FIG. 2 shows a portion of the apparatus of FIG. 1, which circuit diagram shows in detail the devices 14, 19 and 20' for the automatic control of the image contrast. Elements having the same function as those in FIG. 1 are given the same reference numerals. The circuits for processing the radio-frequency signal and the intermediate-frequency amplifier stage are not shown.

The device 19 for comparing the average beam current of the image tube includes a combined line scanning transformer-generator 22, which applies the very high voltage to the anode 18 of the tube 15 while its reference voltage is fixed by a line to a terminal 23 which is subjected to a given positive voltage via a current measuring resistor 24.

The junction point C between the combined arrangement 22 and the current measuring resistor 24 is furthermore connected to a capacitor 25, which has a low value and isolates this junction point from ground, and is also connected to the cathode of a diode $D_1$ whose anode is connected to the junction point A. The time constant of the filter constituted by the resistor 24 and the capacitor 25 is chosen, for example, to correspond to the scanning duration of some lines to some dozens of picture lines.

The current applied to the anode 18 is measured by the current measuring resistor 24 which causes a decrease in the voltage across the junction point C relative to the voltage present at the terminal 23. Consequently, when the beam current of the tube 15 is such that the voltage across the junction point C is lowered, to the extent that the diode $D_1$ is rendered conductive, it results in a voltage decrease at the junction point A. This action causes a storage capacitor 30 which isolates the junction point A from ground, to discharge, which discharge is relatively fast taking account of the value of the current measuring resistor 24. The return to the nominal contrast, when in a subsequent image sequence the beam current is lower, is effected in accordance with a higher time constant when the diode $D_1$ is no longer conductive. By way of example, conditions are chosen for which (taking account of the effect of the storage capacitor 30), the reduction in the contrast is effected in a time interval equivalent to some picture fields (2 to 4, for example,) while the return to the nominal contrast is effected after a number of fields (10 to 20, for example). The beam current limiting circuit described in the foregoing is absolutely not limitative, as it is alternatively possible to arrange the current measuring resistor in series with the cathodes, and alternatively to ensure the current control in a different manner than by means of the video gain, for example by acting on one of the tube grids.

FIG. 2 shows in greater detail the elements forming the device 14' for comparing the peak values of each one of the video signals R, V, B with a given reference threshold. In accordance with FIG. 2, this device includes three diodes 41a, 41b, 41c whose cathodes are connected to the outputs of the respective video amplifiers 13a, 13b, 13c. The anodes of these three diodes 41a, 41b, 41c are combined and this combination is connected to a first input 42 of a comparator 43 while a reference voltage Vref is applied to the other input 44 of this comparator. As is shown in the Figure, the reference voltage Vref can be obtained at the sliding contact of a potentiometer 45 whose other terminals are connected to ground and to a given positive voltage, respectively. The comparator §3 is of a type having an open collector output and its output current is applied to the junction point A to discharge the storage capacitor 30 via a resistor 46 which allows adjustment of the discharging time constant. The quiescent voltage of the junction point A, which is applied to the contrast control terminal 21 of the processing circuit 12, which quiescent current is the current producing the maximum contrast when the automatic adjusting devices are absolutely inoperative, is determined by means of a further reference voltage applied to a terminal 47 which is connected to the junction point A via a charging resistor 48.

In accordance with the invention, it is provided that the nominal gain of the amplification of the video signals R, V and B is sufficiently high to ensure that in the majority of received images, the peak values of the video signals reach the reference voltage Vref so that generally the contrast for these images is automatically adjusted in dependence on the comparator 43 and the device which allows the adjustment of the reference voltage Vref constitutes the manual contrast readjusting device the user has at its disposal. Thus, the device which permits an automatic reduction in the contrast, which ;n the prior art was only used to avoid that certain images containing excessively bright portions would be reproduced in an incorrect manner, is now also used to ensure a manual contrast adjustment. The maximum manual contrast adjustment corresponds to a value of the voltage Vref which is nearest to ground, that is to say most remote from the signal voltages R, V and B, corresponding to the black level. For an image having an average video content, the comparator 43 supplies an output current such that the contrast is adjusted to ensure that the brightest portions of the image are reproduced in an appropriate manner. By this same adjustment only images having an exceptionally weak content will result in the comparator 43 having a zero current at the output and would bring the junction point A to a voltage equal to the further reference voltage. When the voltage Vref is increased, that is to say when the voltage of the black level of the signals R, V and B is approached, the resultant action of the comparator 43 will end in an additional reduction of the contrast for the image having the average video content and moreover an automatic contrast reduction will be effected for the images having a weaker content. The resultant effect is particularly satisfactory for the user.

As is shown in FIG. 2, the manual contrast adjusting device 20' may be constituted by a potentiometer such as the potentiometer 45 shown. However it is desirable that there is the possibility to obtain also a manual contrast command utilizing a potentiometer of the electronic type. A command of this type, obtained from a remote control, Will be described with reference to FIG. 3. In this Figure elements corresponding to those in FIG. 2 and having the same functions are given the same reference numerals.

Figure 3:
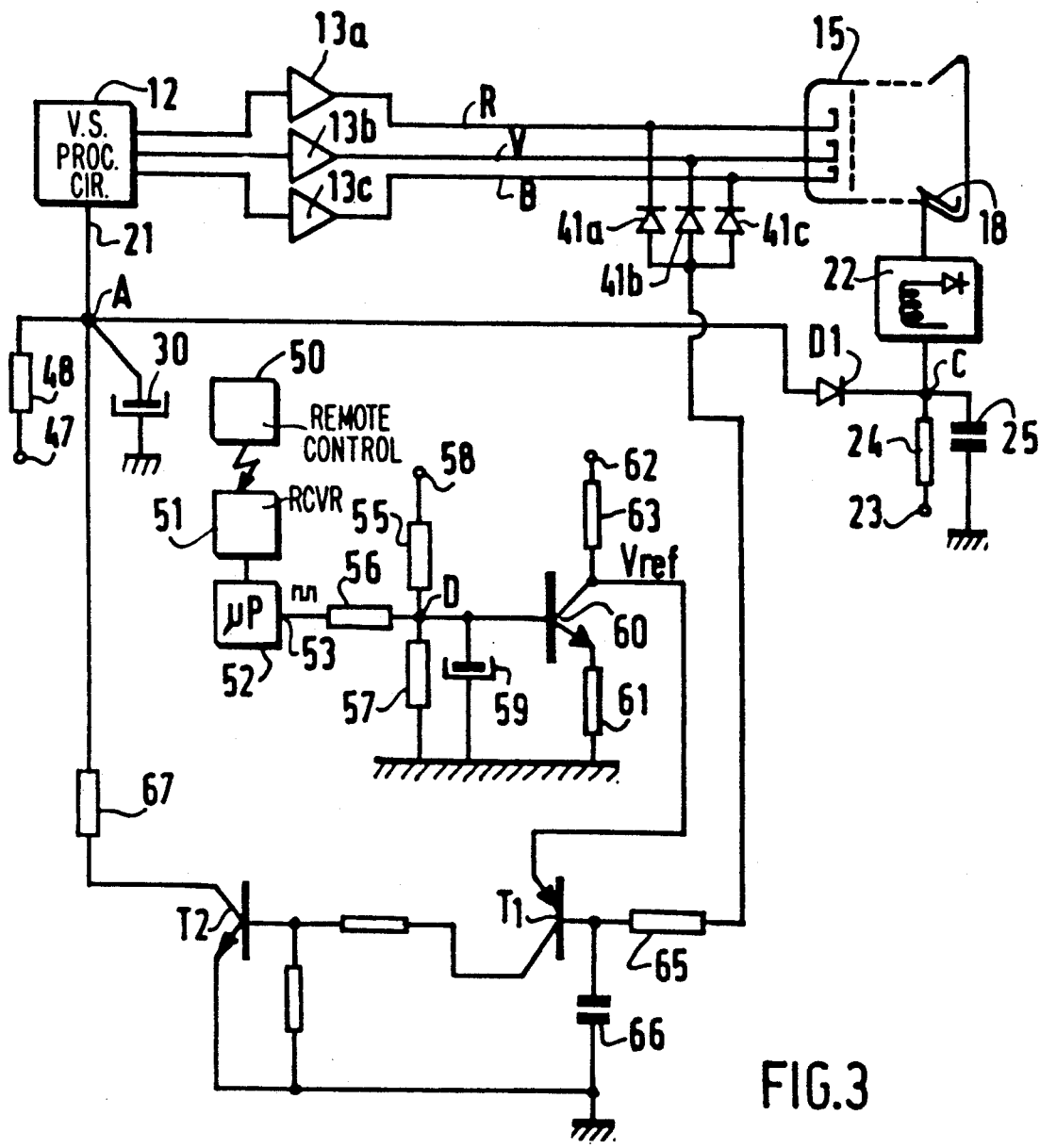
FIG. 3 shows a circuit diagram illustrating certain details of another embodiment of the invention.

The circuit diagram of FIG. 3, which also relates to a color television set shows a detailed example of an embodiment of the invention as regards the device for comparing the peak values of the video signal with a reference threshold, which device is combined with the manual contrast adjustment device activated by remote control. The remote control shown schematically by the block 50 may be of a conventional type, for example using infra-red transmission, and its associated receiving member arranged in the television set is shown at 51. The remote control 50 includes a button for the manual contrast adjustment. The signal corresponding to operating the contrast adjusting button is conveyed in a manner known per se in the encoded form to the receiving member 51 (in the same way as the other remote control signals) and is transmitted to a microprocessor 52. The output port 53 of the microprocessor 52 is used to produce a contrast control signal in the form of square-wave pulse trains whose width varies as a function of the order received by the receiver member 51. This signal is thereafter converted into a d.c. voltage whose level depends on the width of the pulses, by means of a three-resistor network 55, 56, 57 and a capacitor 59 of a high value. The branch forming a divider bridge constituted by the resistors 55 and 57 is connected between a terminal 58, to which a given positive voltage is applied, and ground, respectively. At the tap of said divider bridge, denoted node D, the output signal of the microprocessor 52 is applied via the resistor 56. The voltage obtained at the node D is filtered by the capacitor 59 and can vary in a range which is determined as a function of the possibilities in which the shape of the output signal of the microprocessor 52 can be varied. The voltage across node D is applied to the base of an NPN transistor 60 which serves as an amplifier stage for the d.c. voltage and whose emitter is connected to ground via an emitter resistor 61 and the collector is connected to a positive voltage applied to the terminal 62 via a collector-resistor 63. The collector of the transistor 60 will cause a voltage Vref to appear which is defined as the reference threshold.

FIG. 3 shows a detailed embodiment of the device for comparing the peak values of the video signal with the reference threshold Vref. The device includes a first transistor $T_1$ of the PNP type whose emitter receives the voltage Vref, whose base receives the peak signal of one of the signals R, V, B via at least one of the diodes 41a, 41b, 41c and after having passed through a low-pass filter which has a low time constant and is formed by the resistor 65 and the capacitor 66. The time constant of this low-pass filter is adjusted such that an appropriate delay in the response of the value comparison device is obtained, inter alia to avoid that the device responds to the passage of a very short parasitic signal. The collector current of the first transistor $T_1$ is applied to the base of a second transistor $T_2$, of the NPN type, whose emitter is connected to ground and whose collector current is applied to the node A via a collector-resistor 67 which limits the discharging current of the buffer capacitor 30 and provides a discharging time constant of an appropriate value. The storage capacitor 30 is moreover loaded from the further reference voltage present across the terminal 48, via a load resistor 48. It is consequently the further reference voltage which fixes the voltage for which the contrast command of the processing circuit 12 produces the maximum contrast of the picture, while the action of the two automatic adjusting devices and of the manual adjusting device all produce a reduction in the image contrast by reducing the voltage across the node A.

The embodiment of the invention which has been described so far relates to a color television set. The invention also applies to other types of video image reproducing apparatus monitors) since they utilize a video signal processing circuit provided with a contrast control terminal. It Will be obvious that the invention also applies to the reproduction of monochrome images: it is then of course not necessary to provide a plurality of decoupling diodes such as the diodes 41a, 41b, 41c but a single diode is sufficient.

Relative to the example described, further variations can easily be conceived without departing from the scope of the invention defined hereinafter. The device 14 of FIG. 1 might inter alia alternatively be connected upstream of the amplifiers 13, provided that as a consequence thereof the voltage range in which the threshold Vref can evolve is modified.

For the case in which the device 14 of FIG. 1 is connected upstream of the amplifiers 13, it is interesting to use an integrated circuit which performs the function of the circuit 12 and of the circuit 14 together, and consequently also the function of a white limiter. Two cases are then possible: either the value of the white limit threshold regulated by this integrated circuit is accessible via a plug to be defined via a voltage applied from the exterior, or it is internal and non-controllable. In the first case, the threshold control plug must be connected to the connection vref of FIGS. 2 or 3 and the elements 41 to 43, 46 of FIG. 2 become useless, as also the elements 41, $T_1$, $T_2$, 65, 66, 67 of FIG. 3. For the case in which the value of the internal limiting threshold is not accessible, this is caused by the fact that the internal limiter is of a type which is only intended to avoid clipping and its internal action threshold corresponds to the limit of the possible dynamics: it is then sufficient to maintain, in addition to the integrated circuit, the overall circuit of FIG. 2 or of FIG. 3; the threshold utilized for this latter circuit is lower than the internal threshold of the integrated circuit and because of this fact responds in its place.

Alternatively, a bus for the data transmission within the apparatus, for example a bus known as "bus I2-C" can be provided which is more specifically used to control the adjustment of the contrast value. In this case the invention can still be utilized.

Figure 4:
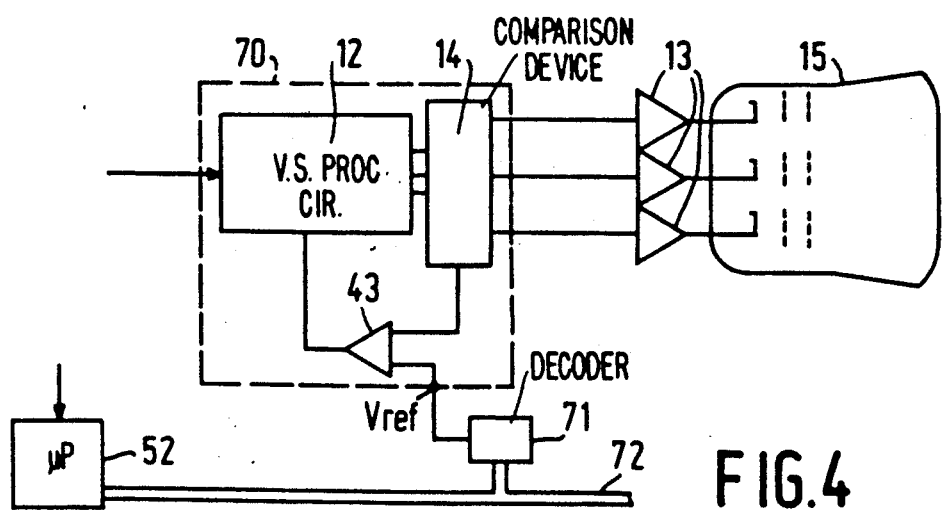
FIG. 4 shows a block diagram illustrating bus control in a further embodiment of the invention.

In this implementation the circuits 12 and 14 are advantageously integrated and the integrated circuit can allow the inputing of the adjustment value of the white limit threshold. There is then an alternative:

Either inputting of the adjustment value of the white limit threshold is effected in the form of an analog value introduced via a plug. FIG. 4 illustrates this case: the reference numerals 12, 14, and 43 denote the same functions as in the preceding Figures, but now they are integrated in one single box 70, which has an input Vref for adjustment of the white limit threshold. The bus 72 is connected to a parallel port of the microprocessor 52, and when the latter receives a contrast adjustment command, it introduces in known manner the corresponding codes the bus 72. A circuit 71 which is exterior to the integrated circuit 70 is then provided to decode the command on the bus, to convert the desired contrast value into an analog voltage, and to apply it to the said plug Vref (such a decoder and a digital-to-analog converter are known per se).

Or the integrated circuit 70 is entirely digital and the input for the white limit threshold adjusting signal is a digital input. Then the input is connected to the bus and it is then sufficient to program the microprocessor such that when the user wants to adjust the contrast, the microprocessor conveys to the bus the code (the address) provided for the adjustment of the white limit threshold value and not the code provided for the adjustment of the contrast. Thus the invention can still be applied since the adjustment of the white limit intended to be effected in the factory during manufacture of the apparatus is in contrast thereto made available for the user and is named "contrast adjustment".

If the integrated circuit includes a non-adjustable limiting threshold, it is sufficient to preserve, in addition to the integrated circuit, a proper portion of the circuit of FIG. 3. There is another alternative:

It is possible to establish the digital value permanently on the bus for contrast adjustment, so that it obtains the maximum contrast, which is one manner of rendering the normally provided adjustment inoperative. In parallel therewith, the means described with reference to FIGS. 2 and 3 are used, that is to say that the contrast control button of the remote control 50 does not act via the bus, but in the manner described in the foregoing with reference to FIG. 3.

it is also possible to omit the arrangement 53–59 of FIG. 3, to establish the contrast value desired by the user on the bus, and as was the case in FIG. 1 for the elements 52, 72, 71, to produce the value Vref and to apply it to the base of the transistor 60 of FIG. 3, the circuit of this FIG. 3 remaining unaltered with the exception of the elements 53–59 which are replaced by the elements 72, 71 of FIG. 4.

I claim:

1. An apparatus for reproducing an image on a cathode-ray tube, comprising a video signal processing circuit for providing an amplification of the video signal either with a given maximum gain or a reduced gain with respect to the maximum gain to modify the image contrast, said video signal processing circuit having a contrast control terminal for receiving a variable control voltage, the apparatus also including a contrast control circuit, comprising a device for comparing peak values of the video signal (of each video signal R (red), V (green) and B (blue)) to a reference threshold, and having an output for applying a signal, which is supplied when this threshold is exceeded, after integration, to said contrast control terminal, and a manual contrast adjusting device for adjusting said reference threshold, characterized in that the nominal gain of the amplification of the video signal is adequately high to provide that, for the majority of the received images, the peak values of the video signal (of each video signal R (red), V (green) and B (blue)) reach said reference threshold.

2. An apparatus as claimed in claim 1, characterized in that the manual contrast adjusting device comprises a microprocessor for supplying square-wave pulse trains, these square-wave pulses constituting, after filtering and amplification, said reference threshold.

3. An apparatus as claimed in claim 2, comprising a remote control, characterized in that this remote control is provided with at least one contrast varying control button, and in that the square-wave pulse trains produced by the microprocessor are modified in response to the action of the said control button, by means of the signal transmitted by the remote control.

4. An apparatus as claimed in any one of the preceding claims, including an integrated video circuit provided with a white limiter whose white limit threshold value can be defined from outside said apparatus, characterized in that means are provided for having said threshold value vary in relation with operating the contrast control by the user.

5. An apparatus as claimed in claim 4, provided with a bus for data transmission within the apparatus, whose integrated circuit is provided to ensure that inputting the value of the white limit threshold is effected via the bus, characterized in that the microprocessor which drives the apparatus is programmed in such a manner that when the user wants to readjust the contrast, its command acts by modifying the value of the white limit threshold indicated by the bus.

6. An apparatus as claimed in claim 4, provided with a bus for data transmission within the apparatus, whose integrated circuit is provided to ensure that inputting the white limit threshold value is effected by applying an analog voltage to a plug, characterized in that a circuit is provided for decoding the command on the bus and applying it to said plug.

7. A method of adjusting the contrast in an image reproducing apparatus on a cathode-ray tube, in which a video signal is processed, and peak values of the video signal are compared with a reference threshold such that the contrast is automatically reduced for the case in which the video signal (at least one of the video signals R, V, B) reaches said reference threshold, characterized in that a rather high nominal gain for the video signal amplifier is used such that for the majority of the received images the said reference threshold is reached, and in that, said reference threshold being variable, this threshold variation is utilized as manual contrast control, put at the disposal of the user.

* * * * *